Dec. 11, 1934.  C. GEIGER  1,983,977
PIPE COUPLING
Filed March 17, 1932
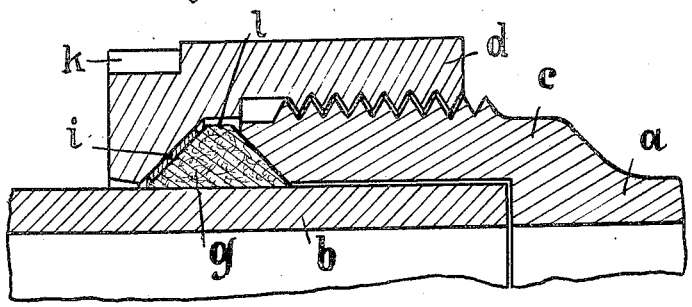
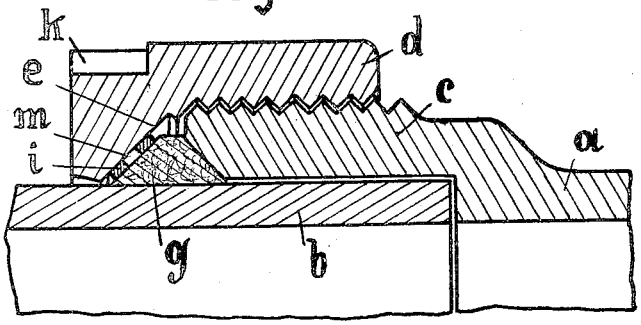
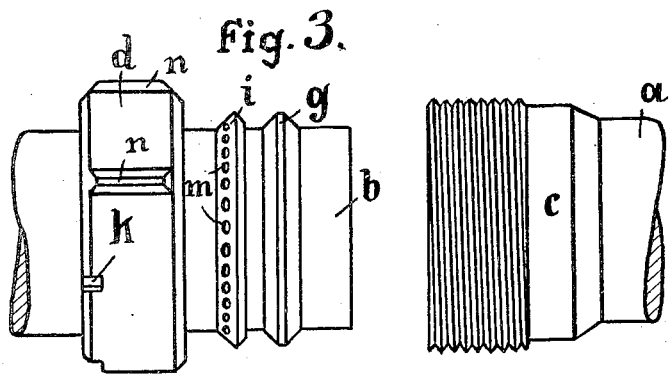
INVENTOR
CARL GEIGER
by
ATTY Patented Dec. 11, 1934

1,983,977

UNITED STATES PATENT OFFICE 1,983,977

PIPE COUPLING

Carl Geiger, Weende-Gottingen, Germany

Application March 17, 1932, Serial No. 599,551
In Germany April 26, 1930

4 Claims. (Cl. 285—123)

For the packing of cast iron and steel sleeve-coupled gas and water pipes of considerable diameter, they are generally caulked, or even welded, after the insertion of hemp and lead. Methods are also known of thrusting over the spigot member of the pipe a ring which is screwed into the sleeve of the socket member, and thereby presses a plurality of packing rings against one another and against the slanting inner wall of the sleeve. As neither the pressure rings nor the packing rings rest with their periphery against the annular inner wall of the sleeve, it is possible for a soft packing material to escape into the hollow space present, and, moreover, the packing pressure must be absorbed substantially by the pressure rings.

Escape of the packing material is also possible with another kind of pipe coupling, in which a threaded collar is screwed onto a sleeve by means of a coarse thread, and thereby presses by means of a pressure ring into an annular space filled with packing material without closing the inlet.

Further, screwed pipe couplings with smooth pipes without sleeves are known, in which a soldered or rolled-on threaded ring is screwed into a threaded collar engaging over the other end of the pipe, and between the end surface of the ring and the inner wall of the collar a soft, metallic packing ring is placed. Escape of the packing material in the hollow space between the inner wall of the collar and the outer wall of the packing ring is easily possible; moreover, the pipes are not in mutual alignment, which is absolutely necessary for pipes of great diameter. Insofar as, in order to facilitate the tightening of the packing rings, pressure rings have been arranged between the packing rings and the collar to be rotated, the outer surfaces of the packing rings still rest on the collar and thus make it difficult for the pipe coupling to be screwed up firmly and tightly.

The subject of the present invention is a pipe coupling especially for cast iron and steel sleeve-coupled pipes in which the sleeve which is integral with the socket member, forms over its entire length a socket for the spigot member, which abuts against a shoulder at the inner extremity of the sleeve, while on the outside of the sleeve, it is advantageous to provide a coarse thread for securing the coupling collar, the inner packing surface of which together with the end surface of the sleeve and the spigot member, encloses an annular space, preferably of triangular or semicircular cross-section, completely filled by the packing ring. With this arrangement the surface of the packing ring resting against the smooth outer surface of the spigot member and which is narrower than the length of the socket is preferably about as large as any of the packing surfaces resting against the end surfaces of the collar or the pipe sleeve.

Moreover, particularly in the case of cement pipes and "durasbest" pipes, a pressure ring may be arranged between the slanting inner surface of the coupling collar and the packing ring which, at least before tightening, prevents the packing ring from resting against the inner walls of the collar, thus enabling the pipe coupling to be tightened easily. In order to prevent unintentional loosening of the collar, the pressure ring may be provided with holes into which the packing material enters when great pressure occurs, in order to be forced tightly against the slanting pressure surface of the collar.

The pipe coupling according to the invention is composed of few individual parts, no caulking or welding is necessary, and it provides a thoroughly fluid-tight pipe coupling, even in the case of pipes of considerable diameter and with high working pressures, whilst it is not affected by movements of the ground or by vibrations caused by street traffic.

Embodiments of a pipe coupling according to this invention are shown in the annexed drawing, wherein:—

Fig. 1 shows a similar pipe coupling in which the front end of the pipe sleeve is of reduced cross section and protrudes into the packing space.

Fig. 2 shows a longitudinal section of a pipe coupling with a perforated pressure ring, and Fig. 3 is a view of the individual parts thereof unscrewed.

In the form of construction shown in Figs. 1, 2 and 3, the pipes $a$ and $b$ to be connected have at their socket end a sleeve $c$ which receives the spigot member and allows sufficient clearance. The outside of the sleeve $c$ is provided with a thread which engages with a similar inner thread of a coupling collar $d$ to be screwed thereon, which collar is passed over the spigot member $b$.

The end of the sleeve $c$ is undercut and the inner end of the collar $d$ is provided with a straight portion inclined oppositely to the undercut end of the sleeve $c$. Between the two inclined surfaces of the sleeve $c$ and the coupling collar $d$ there is arranged a packing ring

*g* of triangular cross section, which, when the coupling collar *d* is secured onto the sleeve, is compressed between the end surfaces and is pressed against the outer wall of the spigot end *b*.

To enable the coupling collar to be rotated, axial slots *k* are provided on the periphery in which suitable tools can engage. The packing ring may be formed of flexible metal, rubber, or any similar substance.

In the form of construction shown, between the slanting pressure surface of the collar *d* and the packing ring *g*, there is provided a pressure ring *i* which is intended, particularly in the case of cement pipes or "durasbest" pipes to facilitate the tightening of the coupling collar. In order to prevent the pipe coupling from becoming loosened by shaking of the ground, for instance by street traffic, the packing ring can—as shown in Fig. 1—be so arranged that, before tightening of the coupling collar is effected, its narrow peripheral surface is situated a short distance from a cylindrical inner surface *l* of the coupling collar *d* into which cylindrical space the reduced front end of the sleeve, closing the packing space, protrudes. In this form of construction when under heavy pressure the packing ring will tend to extend radially outwards, and then rest with its narrow peripheral surface against the coupling collar to which, after the collar has been completely tightened, the packing material will adhere, so that the friction between the packing ring and the coupling collar prevents any spontaneous loosening of the pipe coupling.

In the form of construction shown in Figs. 2 and 3 the pressure ring *i* is provided with holes *m* arranged in the middle, and into which, when a certain pressure is attained, the packing material is adapted to enter, so that after the collar has been sufficiently tightened, the packing material which has been pressed into the holes *m* adheres to the pressure surface *e* of the collar, and can be relied upon to prevent the pipe coupling becoming loosened by the vibration caused by street traffic.

The pressure of the packing ring against the spigot end of the pipe and the end surface of the pipe sleeve ensures the tightness and security of the connection even at high working pressures. Further, owing to the simple construction of the packing surfaces and the few individual parts, it is possible to dispense with the caulking tools or welding equipment hitherto necessary and also the workmen necessary to employ these tools, so that the pipe laying is very much simplified and the working time is shortened.

I claim:

1. A pipe coupling for gas and water pipes of uniform diameter including a sleeve integral with the one pipe member and formed throughout its full length with a bore to receive the spigot member of the other pipe, a screw cap, the internal surface of the screw cap in line with the sleeve being inclined, the free end of the sleeve being inclined opposite to the inclination of the cap surface, a yielding circumferentially-complete packing ring having its respective end surfaces inclined in coincidence with the inclinations of the cap surface and of the end of the sleeve, a pressure ring interposed between the inclined surfaces of the screw cap and the packing serving as an anti-friction element between the cap and packing, said pressure ring being formed with holes and being relatively thin providing for penetration of the packing through the holes for adherence to the inclined surface of the cap under strong connecting pressure.

2. A pipe coupling for gas and water pipes of uniform diameter, including a sleeve integral with the one pipe member and formed throughout its full length with a recessed bore to receive the spigot member of the other pipe, a closed packing ring of elastic material, a screw cap enclosing said packing between an inclined internal surface of the cap and an opposite beveled front face of the free end of the sleeve, said packing ring having its free end surfaces inclined in coincidence with the inclinations of the internal surfaces of the cap and of the end of the sleeve, and an annular layer of material of small sliding friction interposed between the inclined internal cap surface and the packing, said annular layer releasing a portion of the packing ring for direct adherence to the interior surface of the cap under strong connecting pressure of the parts.

3. A pipe coupling for gas and water pipes of uniform diameter, including a sleeve integral with the one pipe member and formed throughout its full length with a recessed bore to receive the spigot member of the other pipe, a screw cap, the adjacent faces of the screw cap and the free end of the sleeve being oppositely inclined, a closed packing ring of elastic material having its end surfaces inclined in coincidence with and arranged between the inclinations of the internal surface of the cap and the end of the sleeve, and a metallic pressure ring interposed between the inclined internal surfaces of the cap and the packing, said pressure ring being formed to release a portion of the packing ring for direct adherence to the interior surface of the cap under strong connecting pressure.

4. A pipe coupling for gas and water pipes of uniform diameter, including a sleeve integral with the one pipe member and formed throughout its length with a recessed bore to receive the spigot member of the other pipe, a screw cap having an inclined internal surface, the free end of the sleeve adjacent such surface being oppositely inclined, a closed packing ring of elastic material arranged between and having its end surfaces inclined in coincidence with the internal surfaces of the cap and the end of the sleeve, and a relatively thin metallic pressure ring interposed between the internal cap surface and the correspondingly inclined surface of the packing, said pressure ring being formed with holes for the penetration of the yielding packing through the holes and its direct adherence to the internal surface of the cap under strong connecting pressure.

CARL GEIGER.